United States Patent
Trujillo et al.

(10) Patent No.: US 7,506,707 B2
(45) Date of Patent: Mar. 24, 2009

(54) GUIDED AIRPLANE RELOCATING DEVICE

(75) Inventors: Richard R. Trujillo, North Bend, WA (US); David L. Wagner, Goldendale, WA (US); Peter D. McCowin, Enumclaw, WA (US); D. Bruce Thomas, Jr., Shoreline, WA (US)

(73) Assignee: The Boeing Company, Chicago, IL (US)

( * ) Notice: Subject to any disclaimer, the term of this patent is extended or adjusted under 35 U.S.C. 154(b) by 534 days.

(21) Appl. No.: 11/269,948

(22) Filed: Nov. 9, 2005

(65) Prior Publication Data

US 2007/0102204 A1   May 10, 2007

(51) Int. Cl.
*B62D 51/04* (2006.01)

(52) U.S. Cl. ............................ 180/19.1; 180/904

(58) Field of Classification Search ............... 180/19.1, 180/19.2, 19.3, 11, 12, 904; 244/114 R, 244/115, 50, 51
See application file for complete search history.

(56) References Cited

U.S. PATENT DOCUMENTS

| | | | | |
|---|---|---|---|---|
| 2,539,010 A | * | 1/1951 | Cox | 244/50 |
| 2,751,990 A | * | 6/1956 | Pearson et al. | 180/6.2 |
| 2,949,972 A | * | 8/1960 | Wirkkala | 180/19.1 |
| 3,025,922 A | * | 3/1962 | Savidge | 180/14.7 |
| 3,150,734 A | * | 9/1964 | Duggar, Jr. | 180/11 |
| 3,825,869 A | * | 7/1974 | Loomis | 414/427 |
| 4,125,029 A | * | 11/1978 | Krezak et al. | 74/13 |
| 4,582,154 A | * | 4/1986 | Englund | 180/342 |
| 4,589,509 A | * | 5/1986 | Chase | 180/343 |
| 4,687,070 A | * | 8/1987 | Ricciardi | 180/14.7 |
| 4,730,685 A | * | 3/1988 | Sinkkonen | 180/14.7 |
| 4,883,280 A | * | 11/1989 | Christian | 280/3 |
| 4,915,185 A | * | 4/1990 | Olson | 180/19.2 |
| 5,511,926 A | * | 4/1996 | Iles | 414/428 |
| 7,145,298 B1 | * | 12/2006 | Garner | 318/17 |

* cited by examiner

*Primary Examiner*—Paul N Dickson
*Assistant Examiner*—Marc A Scharich
(74) *Attorney, Agent, or Firm*—Weiss & Moy, P.C.

(57) ABSTRACT

A guided vehicle relocation device has a frame. The frame has an opening to allow one or more wheels of a vehicle to enter an interior area of the frame. At least one drive mechanism is coupled to the frame. The drive mechanism engages the wheel of the vehicle, rotating the wheel of the vehicle to move the vehicle. A control panel is coupled to the frame and to the at least one drive mechanism. The control panel is used for controlling operation of the guided vehicle relocation device.

19 Claims, 5 Drawing Sheets

GUIDED AIRPLANE RELOCATING DEVICE

BACKGROUND OF THE INVENTION

1. Field of the Invention

The present invention relates generally to assembly lines, and more particularly, to a guided airplane relocation device which provides a portable piece of equipment, capable of being setup and operated by a single person, and provides a method of semi-autonomous directional control and automated moving of heavy wheeled assemblies.

2. Background Information

In the construction of heavy wheeled vehicles such as airplanes, large construction/transportation vehicles, and the like, the heavy wheeled vehicles are generally moved from one station to another during the assembly process. In order to move the vehicles down the assembly line, some type of transporting device is required. The transporting device needs to have the ability to follow a prescribed path at a set pace and interface with various types of visual controls.

Several different transporting devices/systems have been developed to move these heavy wheeled vehicles during the assembly process. One type of system uses a chain to pull a plurality of vehicles through the entire assembly shop. The equipment is generally sized to pull multiple vehicles with support stands and equipment. Chain systems are capable of providing movement to a large number of vehicles down the assembly floor. However, chain systems generally are fixed into the floor of the assembly shop. This generally requires a large amount of capital to implement. Furthermore, built-in chain systems have no ability/mobility to change their layout.

There are transporting devices/systems that are more versatile and costs less than fixed chain systems. One such system consists of a friction plate with guide rails and a winch to pull large wheeled vehicles in predetermined increments along the production floor. This type of system is a lower cost solution than the fixed chain system, and is portable enough to be moved. However, this type of system requires the shop to reposition the winch every predetermined number of feet of travel along the production floor as vehicles are pulled toward the winch. Thus, this system is more a pulse line system wherein movement is not continuous for an entire days worth of production.

Therefore, it would be desirable to provide a transporting device to moved heavy wheeled vehicles during the assembly process that overcomes the above problems.

SUMMARY OF THE INVENTION

A guided vehicle relocation device has a frame. The frame has an opening to allow one or more wheels of a vehicle to enter an interior area of the frame. At least one drive mechanism is coupled to the frame. The drive mechanism engages the wheel of the vehicle, rotating the wheel of the vehicle to move the vehicle. A control panel is coupled to the frame and to the at least one drive mechanism. The control panel is used for controlling operation of the guided vehicle relocation device.

The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
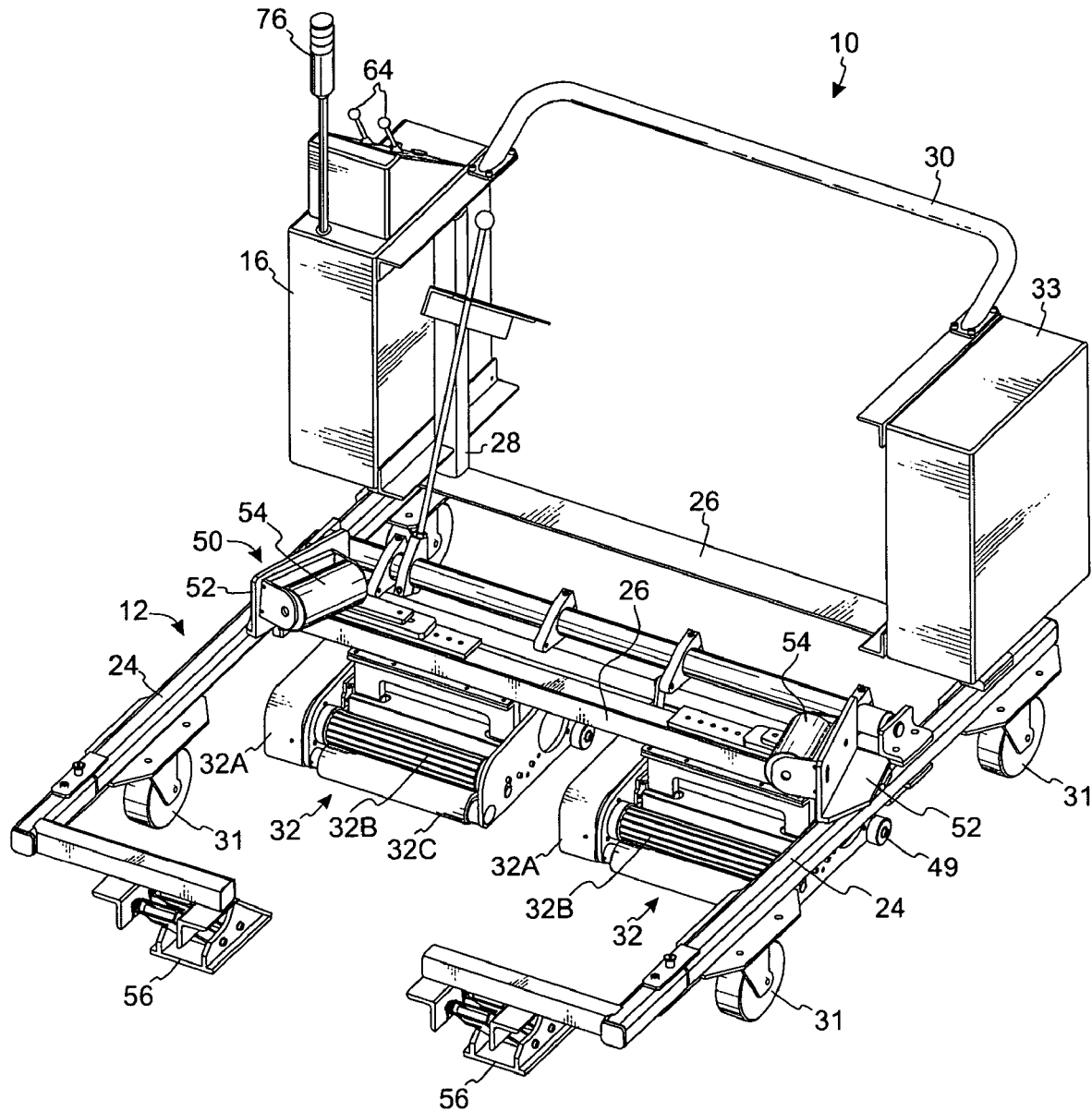
FIG. 1 is an elevated rear perspective view looking from a first angle illustrating a first advantageous embodiment of the present invention.
Figure 2:
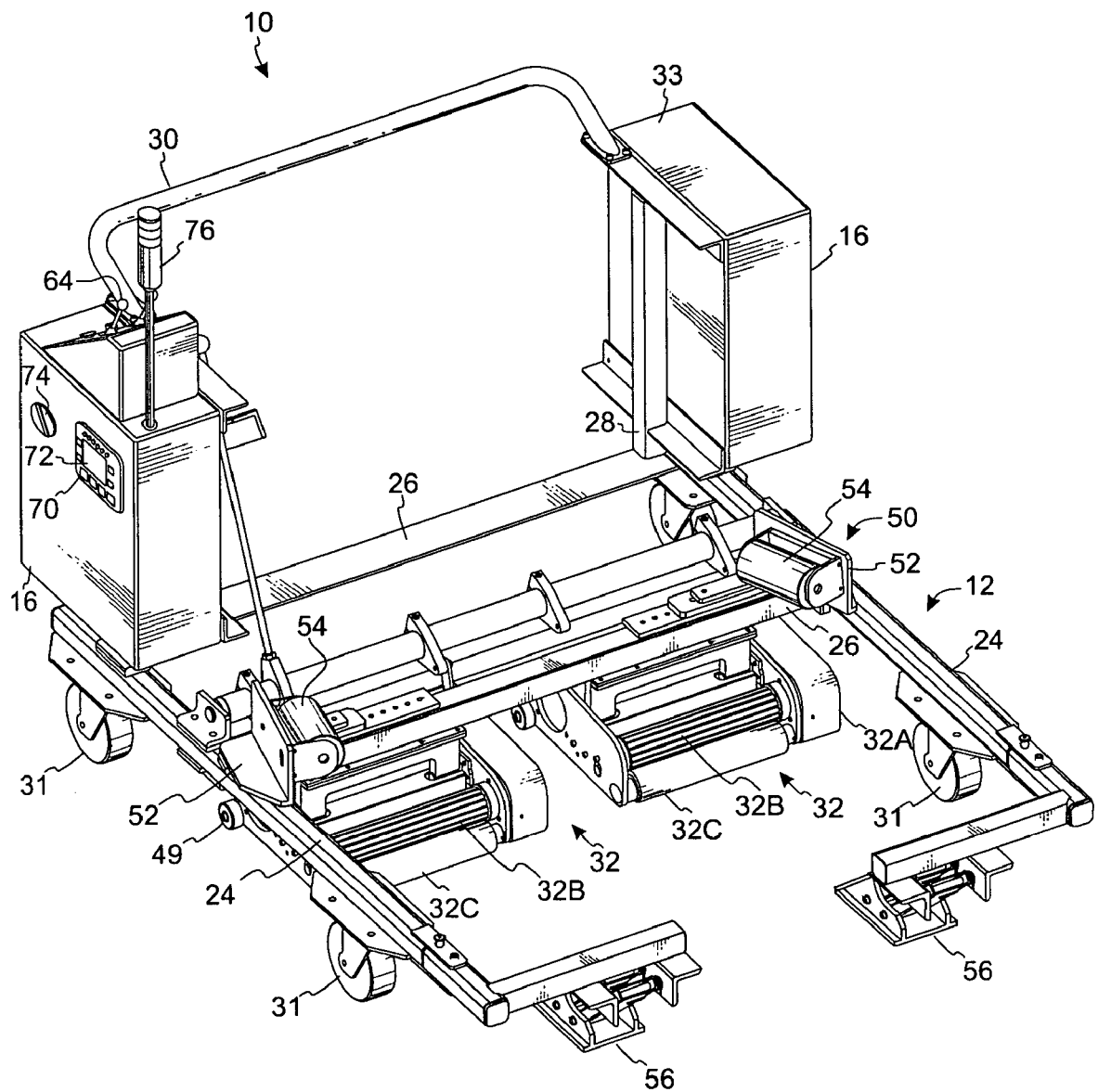
FIG. 2 is an elevated rear perspective view looking from a second angle illustrating the first advantageous embodiment of the present invention.

With reference now to the Figures, a guided vehicle relocation device 10 (hereinafter relocation device 10) is shown. The relocation device 10 provides a portable piece of equipment, capable of being setup and operated by a single person, and provides a method of semi-autonomous directional control and automated moving of heavy wheeled vehicles such as airplanes during assembly. The relocation device 10 has a frame 12, drive motors 32, control panel 16, alignment rollers 54, stop chocks 56, and a location sensor 22.

Referring to FIGS. 1-3 and 6, the relocation device 10 has a frame 12. The frame 12 has an opening which is large enough to allow one or more wheels 40 of the vehicle to be relocated to enter an interior area of the frame 12. In the embodiment depicted in the Figures, the frame 12 has a pair of arm members 24. One or more support members 26 are positioned between the arm members 24 and are coupled thereto. The arm members 24 are separated by a distance that will allow one or more wheels 40 of the vehicle to be relocated to be positioned between the arm members 24.

A pair of vertical arm members 28 extends up from the arm members 24. The vertical arm members 28 may be coupled to an area of the frame 12 where an arm member 24 and support arm 26 intersect. This will provide a more stable platform for the vertical arm member 28. The frame 12 may have a handle 30 coupled thereto. In the embodiment depicted in the Figures, the handle 30 is coupled to the vertical arm members 28. The frame 12 is generally built out of a strong sturdy material such as steel or the like. The above is given as an example. Other materials may be used without departing from the spirit and scope of the present invention.

A plurality of wheels 31 are coupled to the frame 12. In the embodiment depicted in the Figures, the wheels 31 are coupled to the arm members 24. However, the wheels 31 may also be coupled to the support arm 26. Each wheel 31 is in contact with the assembly floor 46 and aids in the movement of the relocation device 10.

One or more drive mechanisms 32 are coupled to the frame 12. Each drive mechanism 32 is generally coupled to one of the support members 26 so that a bottom surface of the drive mechanism 32 engages the assembly floor 46. Each drive mechanism 32 generally engages one wheel 40 of the vehicle. The drive mechanism 32 will cause the wheel 40 of the vehicle to rotate thereby moving the vehicle along the assembly floor 46.

The drive mechanism 32 is generally a drive motor 32A. The drive motor 32A will rotate a drive wheel 32B at a predetermined rate. The drive motor 32A is generally programmable so that one can alter the rate of rotation of the drive wheel 32B thereby controlling the speed and direction at which the vehicle will move along the assembly floor. This will be explained in more detail below.

Figure 5:
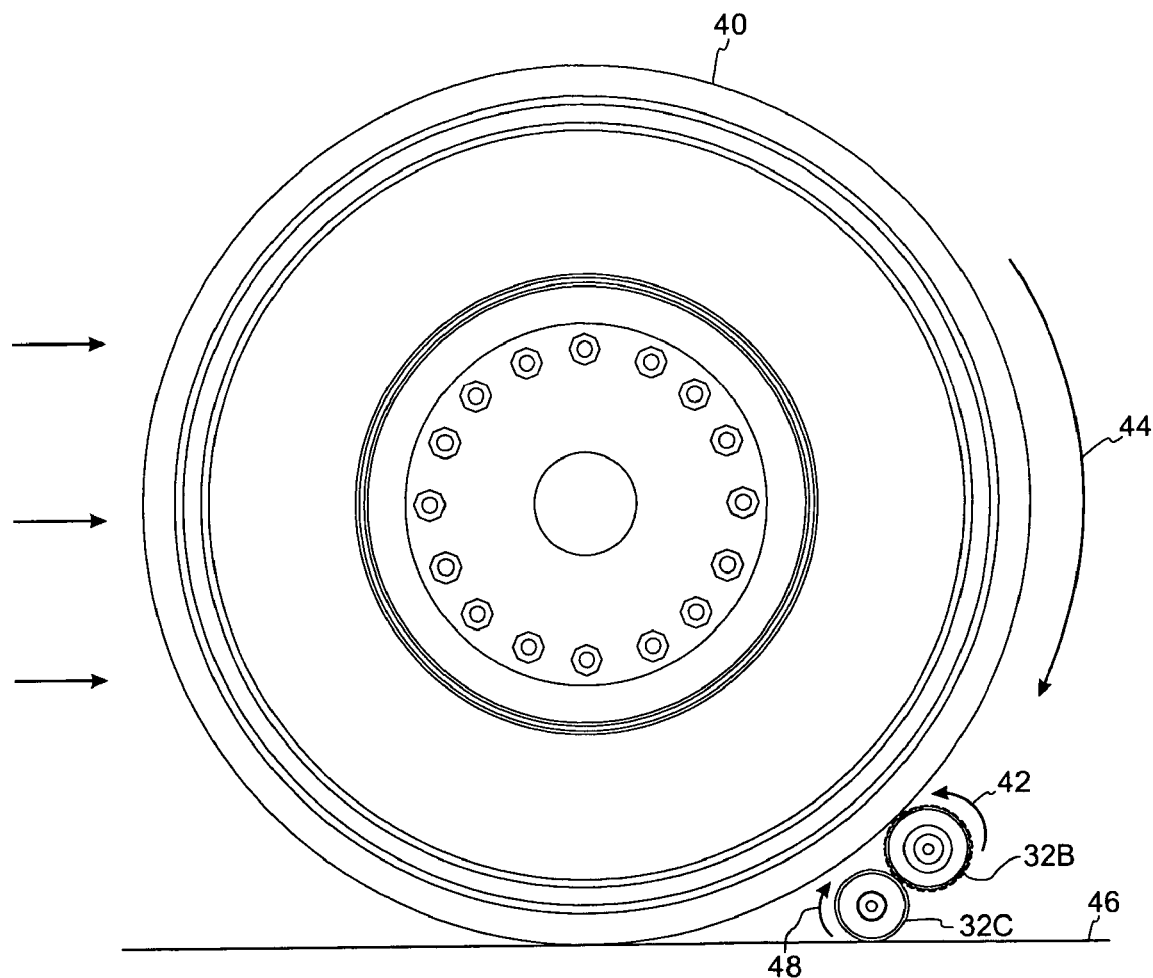
FIG. 5 is a simplified side view showing the rotation of the front airplane wheel and the drive roller used in the present invention.

As shown in FIG. 5, the relocation device 10 is positioned so that the drive wheel 32B engages the wheel 40 of the vehicle. The drive wheel 32B will rotate causing the wheel 40 to also rotate thereby moving the vehicle. In the embodiment depicted in FIG. 5, the drive wheel 32B is positioned in front of and engages the wheel 40 of the vehicle. The drive wheel 32B rotates in a counterclockwise direction as shown by arrow 42. This causes the wheel 40 to rotate in a clockwise direction as shown by arrow 44 thereby moving the vehicle in a forward direction.

The drive wheel 32B also engages a second wheel 32C of the drive mechanism 32. The second wheel 32C is in contact with the drive wheel 32B. The second wheel 32C is compacted against the assembly floor 46 by the weight of the wheel assembly 40. The friction contact loading is transferred to the second wheel 32C by drive wheel 32B as result of the second wheel 32C trying to drive under wheel assembly 40 and rather then lifting the wheel assembly 40 drives it forward. The drive wheel 32B rotates in a counterclockwise direction as shown by arrow 42. This causes the second wheel 32C to rotate in a clockwise direction as shown by arrow 48 thereby moving the relocation device 10 in a forward direction along the assembly floor 46.

Each drive mechanism 32 may also have one or more side wheels 49 coupled thereto. The side wheels 49 are rotational coupled to a side surface of the drive mechanism 32. Each side wheel 49 is in contact with the assembly floor 46 and aids in the movement of the relocation device 10.

A power supply 33 is coupled to the frame 12 and to each drive mechanism 32. The power supply 33 is used for powering each drive mechanism 32. The power supply may be a DC power supply, an AC power supply, combustion engine, or the like. In general, a DC power supply such as a battery or the like will be used.

An alignment device 50 is coupled to the frame 12 adjacent to each drive mechanism 32. When the wheel 40 engages the drive wheel of the drive mechanism 32, the alignment device 50 keeps the wheel 40 centered on the drive wheel 32B. This prevents the wheel 40 from drifting side to side on the drive wheel 32B. If the wheel 40 is allowed to drift, this may cause the relocation device 10 to move off-line and start to move to one side or the other.

In the embodiment depicted in the Figures, the alignment device 50 has an "L" shaped bracket 52 which is coupled to the frame 12. A roller 54 is mounted to the bracket 52. The bracket 52 and the roller 54 are mounted at a slight angle. Thus, if the begins to drift to the side, the wheel 40 will hit the roller 54 forcing the wheel 40 back inward direction and centered on the drive wheel 32B.

One or more stop chocks 56 are movably coupled to the frame The stop chocks 56 are used to prevent the wheels 40 and hence the vehicle from rolling backwards. Once the wheels 40 of the vehicle are positioned within the arm members 24 of the frame 12, the stop chocks 56 are moved so that one stop chock 56 is positioned behind each wheel 40. The stop chocks 56 are spring loaded. Thus, in the initial position, the stop chocks 56 are slightly raised above the assembly floor 46. If the vehicle begins to roll backwards into the stop chocks 56, the wheels 40 will press against the stop chocks 56. The pressure of the wheel 40 on the stop chock 56 will lower the stop chocks 56. As more pressure is applied by the wheel 40, the stop chock 56 will continue to lower until the stop chock hits the assembly floor 46. The more the wheel 40 press into the stop chock 56, the harder the stop chock 56 will be pressed into the floor, thereby preventing the vehicle from rolling backwards. Once the pressure on the stop chock 56 is released, the stop chock 56 will go back to an initial position which is slightly raised above the assembly floor 46.

The relocation device 10 has a location sensor 22. The location sensor 22 is used to determine if the relocation device 10 is traveling on a proper path. The location sensor 22 monitors a travel path 58 which is marked on the assembly floor 46. If the sensor 22 detects that the relocation device 10 is deviating from the travel path 58, the sensor 22 will send a signal which alters the speed of the different drive mechanisms 32. By altering the speed of the different drive mechanisms 32, the direction of the relocation device 10 can be altered so that the relocation device 10 gets back on the travel path 58.

The location sensor 22 may be a single sensor or a sensor array. If a sensor array is used, if one of the sensors does not detect the travel path 58, that sensor may send a signal which alters the speed of the different drive mechanisms 32 so that the relocation device 10 gets back on the travel path 58. The sensor may be a proximity sensor, an optical sensor, or the like. The listing of the above should not be seen as to limit the scope of the present invention.

The location sensor 22 has an adjustment plate 60. The adjustable plate 60 is coupled to a top surface of the location sensor 22. The adjustment plate 60 allows one to move the location sensor 22 so that the location sensor 22 is properly centered on the travel path 58.

The location sensor 22 is removably coupled to the frame 12. In accordance with one embodiment of the present invention, a support arm 62 is used to removably couple the location sensor to the frame 12. One end of the support arm 62 is coupled to the adjustment plate 60 of the location sensor 22. A second end of the support arm 62 is removably coupled to the frame 12. In the embodiment depicted in FIG. 3, once the wheels 40 of the vehicle are positioned within the arm members 24 of the frame 12, the support arm 62 is coupled to the frame 12 so that the support arm 62 is positioned between the two wheels 40 and extends out of the back of the frame 12. One can then slide the adjustment plate 60 to move the location sensor 22 so that the location sensor 22 is properly centered on the travel path 58.

A control panel 16 is used to control the operation of the relocation device 10. The control panel 16 is coupled to the frame 12 of the relocation device 10. The control panel 16 is also electrically coupled to each drive mechanism 32 and the location sensor 22. One can manually control each drive mechanism 32 via the control panel 16 or automatically control each drive mechanism 32 by programming each drive mechanism 32 through the control panel 16. The control panel 16 can also automatically control each drive mechanism 32 via the location sensor 22. The location sensor 22 monitors the travel path 58 which is marked on the assembly floor 46. If the sensor 22 detects that the relocation device 10 is deviating from the travel path 58, the sensor 22 will send a signal to the control panel 16. The control panel 16 may then send signals to the different drive mechanisms 32. By altering the speed of the different drive mechanisms 32, the direction of the relocation device 10 can be altered so that the relocation device 10 gets back on the travel path 58.

The control panel 16 has a joystick control 64 for each drive mechanism 32. The joystick control 64 allows an operator of the relocation device 10 to manually control the operation of each drive mechanism 32. Thus, the operator can control the direction of rotation, speed of rotation, and the like for each drive mechanism 32. This will allow the operator to move the relocation device 10 to a desired position. For example, the operator can have the drive wheel 32B rotate in a counter-clockwise or clockwise direction thereby moving the relocation device 10 in a forward or backwards direction. The operator can also control the speed of the drive wheel 32B. By having one drive wheel 32B rotate at a faster rate than the other drive wheel 32B, one can make the relocation device 10 turn in a desired direction.

The control panel 16 may also have a start/stop switch 66. The start/stop switch 66 is used to activate and deactivate the relocation device 10 by powering up and down each drive mechanism 32 and the control panel 16. An emergency stop button 68 is also located on the control panel 16. The emergency stop button 68 is used to automatically shut down all operation of the relocation device 10.

The control panel 16 may also have a keypad 70 coupled thereto. The keypad 70 is used for programming the relocation device 10. The keypad 70 may be used for programming the speed of each drive mechanism 32, entering start and stop times for automated movement of the relocation device 10, entering security codes to allow a user to activate the relocation device 10, and the like. If production needs to be changed to meet new demands, the keypad 70 may be used to reprogram the relocation device 10 to change the speed of each drive mechanism 32, the start and stop times, and the like. The listing of the above is given as an example and should not be seen as to limit the scope of the present invention.

The control panel 16 may further have a display screen 72. The display screen 72 is used to visually display operating information regarding the relocation device 10. The display screen 72 may be a liquid crystal display (LCD), light emitting diode (LED) displays, or the like.

A modem 74 may also be coupled to the control panel 16. The modem 74 is used to load and download information to and from the control panel 16. The modem 74 may be a wired or wireless modem. A wireless modem would allow an individual to remotely access the control panel 16. Thus, one can monitor and/or control the operation of the relocation device 10 from a remote location.

One or more warning lights 76 may also be coupled to the control panel 16. The warning lights 76 will provide a visual indication of the operation of the relocation device 10. The warning lights 76 may signal if the relocation device 10 is moving, stopped, emergency stop, slowing down, and the like. The listing of the above is given as examples and should not be seen as to limit the scope of the present invention.

Figure 3:
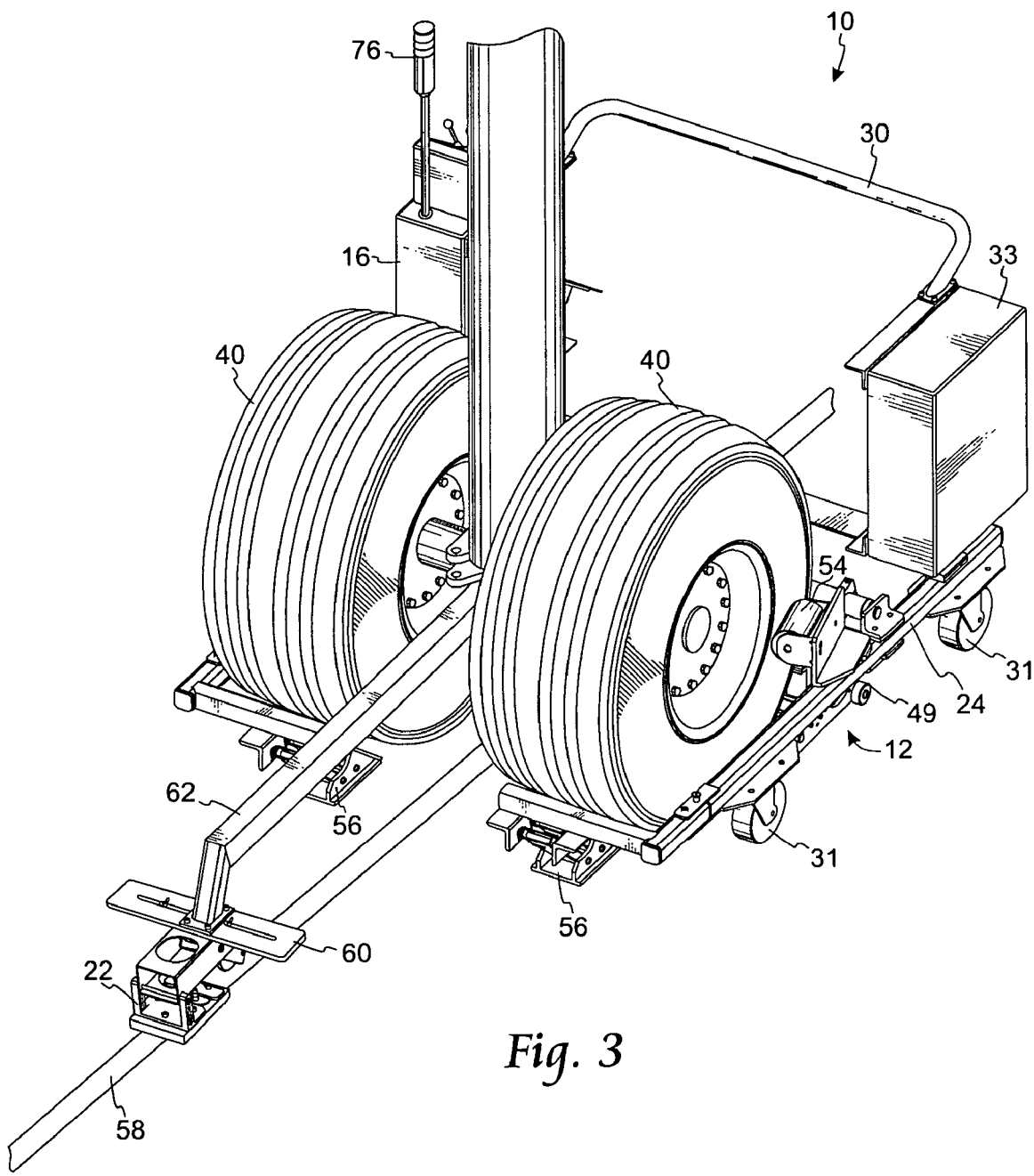
FIG. 3 is an elevated rear perspective view of the first advantageous embodiment of the present invention with the front wheels of an airplane positioned within and the sensor device attached thereto.
Figure 4:
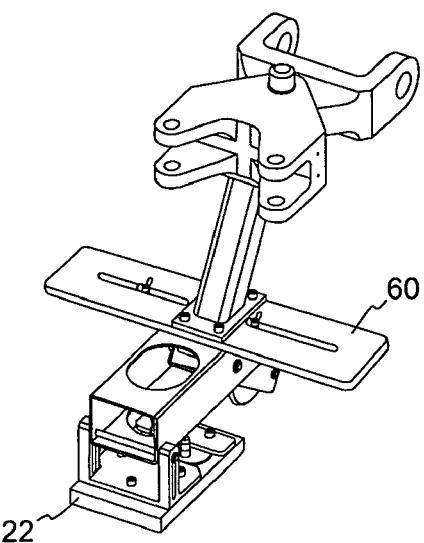
FIG. 4 is an elevated perspective view of the sensor device used in the present invention.
Figure 6:
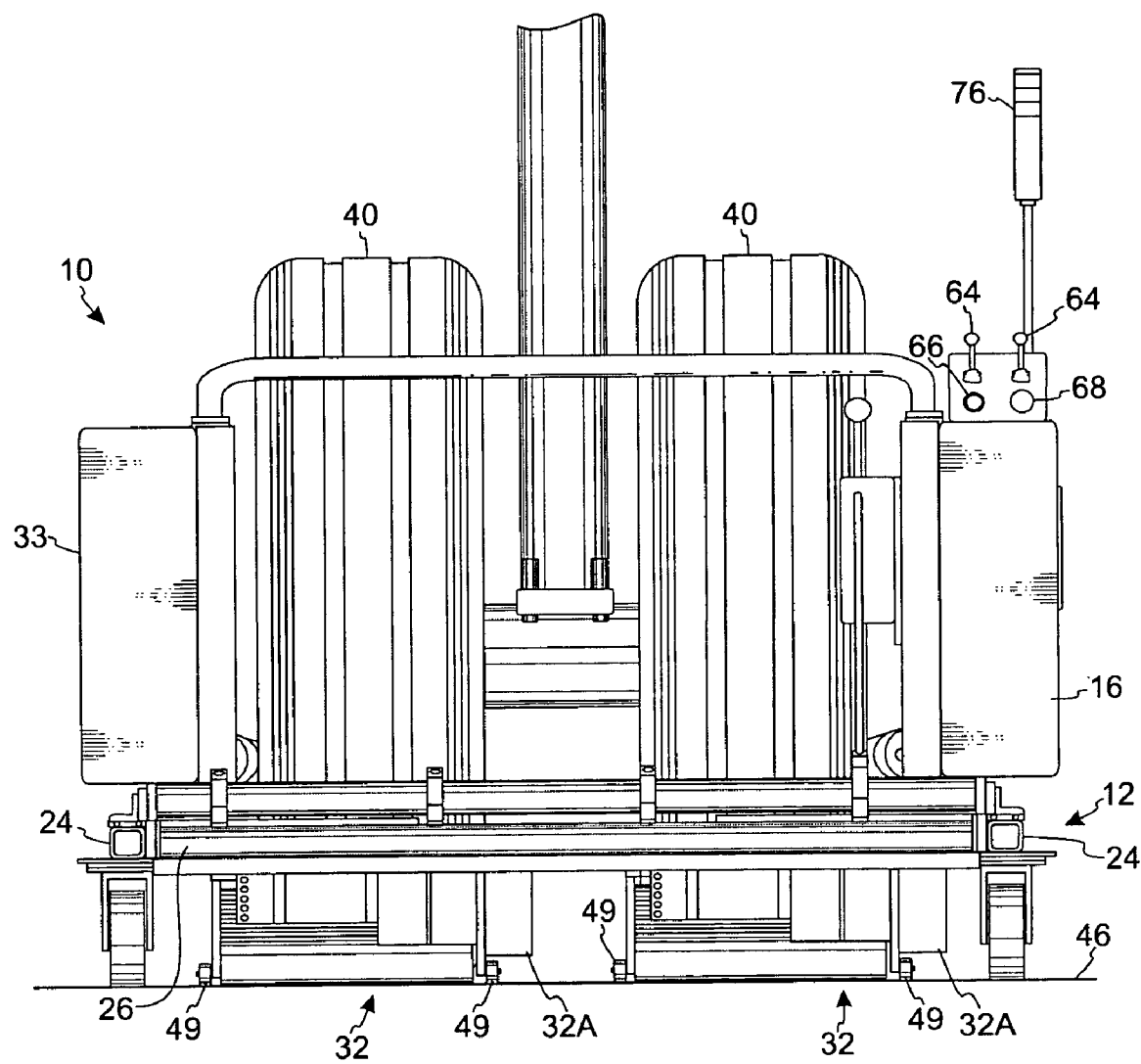
FIG. 6 is a front view of a first advantageous embodiment of the present invention.

In operation, the operator of the relocation device 10 will use the joystick control 64 to move the relocation device 10 so that the tires 40 of the vehicle are positioned between the arm members 24 of the frame 12. As shown in FIGS. 3 and 6, the front wheels 40 of a landing gear of an airplane are positioned between the arm members 24 of the frame 12. The relocation device 10 is positioned so that the drive wheel 32B engages the wheel 40 of the vehicle. Once the wheels 40 of the vehicle are positioned within the arm members 24 of the frame 12, the stop chocks 56 are moved so that one stop chock 56 is positioned behind each wheel 40. The location sensor 22 is then coupled to the frame 12 and aligned with the travel path 58. One can then slide the adjustment plate 60 to move the location sensor 22 so that the location sensor 22 is properly centered on the travel path 58. One can then program the relocation device 10 using the keypad 70 on the control panel 16. The operator may program the speed of each drive mechanism 32, entering start and stop times for automated movement of the relocation device 10, entering security codes to allow a user to activate the relocation device 10, and the like.

The relocation device 10 will then pull the vehicle down the assembly floor 46. The location sensor 22 will ensure that the relocation device follows the travel path 58 by sending signals to the control panel 16 so that the control panel 16 can send signals to the different drive mechanisms 32. By altering the different drive mechanisms 32, the direction of the relocation device 10 can be altered so that the relocation device 10 gets back on the travel path 58.

This disclosure provides exemplary embodiments of the present invention. The scope of the present invention is not limited by these exemplary embodiments. Numerous variations, whether explicitly provided for by the specification or implied by the specification, such as variations in structure, dimension, type of material and manufacturing process may be implemented by one of skill in the art in view of this disclosure.

What is claimed is:

1. A guided vehicle relocation device comprising:
   a frame, wherein the frame has an opening to allow one or more wheels of a vehicle to enter an interior area of the frame;
   at least one drive mechanism coupled to the frame, the drive mechanism engaging the wheel of the vehicle and rotating the wheel of the vehicle to move the vehicle;
   a control panel coupled to the frame and to the at least one drive mechanism for controlling operation of the guided vehicle relocation device; and
   at least one stop chock movably coupled to the frame, the stop chock positioned behind the wheel of the vehicle after the wheel enters the interior area of the frame, to prevent the wheel of the vehicle from rolling backwards.

2. A guided vehicle relocation device in accordance with claim 1 further comprising a sensor coupled to the frame and to the control panel that monitors a travel path, the sensor sending a signal to the control panel when the guided vehicle relocation device deviates from the travel path.

3. A guided vehicle relocation device in accordance with claim 1 further comprising a plurality of wheels coupled to the frame.

4. A guided vehicle relocation device in accordance with claim 1 further comprising alignment rollers coupled to the frame to keep the wheel aligned on the drive mechanism.

5. A guided vehicle relocation device in accordance with claim 1 wherein the control panel comprises at least one joystick control to manually control the at least one drive mechanisms.

6. A guided vehicle relocation device in accordance with claim 1 wherein the control panel comprises a keypad to enter operating data for the guided vehicle relocation device.

7. A guided vehicle relocation device in accordance with claim 1 wherein the control panel comprises a modem for uploading and downloading data to the control panel.

8. A guided vehicle relocation device in accordance with claim 1 further comprising a plurality of warning lights coupled to the frame and the control panel for providing visual indication of operating conditions of the guided vehicle relocation device.

9. A guided vehicle relocation device comprising:
   a frame, the frame having an opening to allow a pair of wheels of a vehicle to enter an interior area of the frame;
   a pair of drive mechanisms coupled to the frame, wherein one drive mechanism engages one of the pair of wheels and rotates the one wheel to move the vehicle;
   a control panel coupled to the frame and to the pair of drive mechanisms for controlling operation of the guided vehicle relocation device; and a sensor coupled to the frame and to the control panel that monitors a travel path, the sensor sending a signal to the control panel to correct a direction of travel when the guided vehicle relocation device deviates from the travel path.

10. A guided vehicle relocation device in accordance with claim 9 further comprising a pair of alignment rollers coupled to the frame to keep the pair of wheels aligned on the pair of drive mechanisms.

11. A guided vehicle relocation device in accordance with claim 9 further comprising at least one stop chock movably coupled to the frame, the stop chock positioned behind one of the pair of wheels after the pair of wheels enter the interior area of the frame.

12. A guided vehicle relocation device in accordance with claim 9 further comprising a plurality of wheels coupled to the frame.

13. A guided vehicle relocation device in accordance with claim 9 wherein the control panel comprises:
   a pair of joystick controls to manually control each of the pair of drive mechanisms; and
   a keypad to enter operating data for the guided vehicle relocation device.

14. A guided vehicle relocation device in accordance with claim 13 wherein the control panel further comprises a modem for uploading and downloading data to the control panel.

15. A guided vehicle relocation device in accordance with claim 13 further comprising a plurality of warning lights coupled to the frame and the control panel for providing visual indication of operating conditions of the guided vehicle relocation device.

16. A guided vehicle relocation device in accordance with claim 9 wherein each of the pair of drive mechanisms comprises:
   a roller;
   a drive wheel which engages one of the pair of wheels and the roller and rotates the one wheel and the roller to move the vehicle; and
   a drive motor for rotating the drive wheel.

17. A guided airplane relocation device comprising:
   a frame, the frame having an opening to allow a pair of front wheels of a landing gear of an airplane to enter an interior area of the frame;
   a pair of drive mechanisms coupled to the frame, wherein one drive mechanism engages one of the pair of wheels and rotates the one wheel to move the airplane;
   a pair of alignment rollers coupled to the frame to keep the pair of wheels aligned on the pair of drive mechanisms;
   a control panel coupled to the frame and to the pair of drive mechanisms for controlling operation of the guided airplane relocation device; and
   a sensor coupled to the frame and to the control panel that monitors a travel path, the sensor sending a signal to the control panel to correct a direction of travel when the guided airplane relocation device deviates from the travel path.

18. A guided airplane relocation device in accordance with claim 17 wherein the control panel comprises:
   a pair of joystick controls to manually control each of the pair of drive mechanisms; and
   a keypad to enter operating data for the guided airplane relocation device.

19. A guided airplane relocation device in accordance with claim 17 wherein each of the pair of drive mechanisms comprises:
   a roller;
   a drive wheel which engages one of the pair of wheels and the roller and rotates the one wheel and the roller to move the airplane; and
   a drive motor for rotating the drive wheel.

* * * * *